Nov. 16, 1965  R. T. LAWRIE  3,217,473
SWATHER ATTACHMENT
Filed June 4, 1964  2 Sheets-Sheet 1

INVENTOR
Robert T. Lawrie

Nov. 16, 1965   R. T. LAWRIE   3,217,473
SWATHER ATTACHMENT
Filed June 4, 1964   2 Sheets-Sheet 2

INVENTOR
Robert T. Lawrie

United States Patent Office 3,217,473
Patented Nov. 16, 1965

3,217,473
SWATHER ATTACHMENT
Robert T. Lawrie, 15 Wesley St., Apt. 4,
Toronto, Ontario, Canada
Filed June 4, 1964, Ser. No. 372,457
1 Claim. (Cl. 56—23)

This invention relates to improvements in agricultural machinery and more particularly to improvements in swathing devices generally utilized in the harvesting of standing crops of hay, grain and the like.

Swathers of the prior art are specialized machines designed for this one job only and as such it is uneconomical for a farmer to own one for private use. It is, therefore, generally essential that a person owning such a swather must rent it out to farmers and the like during the harvesting season in order to recuperate his financial outlay on the machine. On the other hand, persons wishing to avail themselves of the service of the machine must wait their turn and it often happens that, while waiting, bad weather severely damages the standing crop before it can be harvested.

It is therefore a prime object of my invention to provide a swather attachment which can be utilized in combination with a tractor having power take-off facilities, in order to eliminate the requirement for a complete machine and thereby reduce the cost sufficiently to enable individual farmers to own their own swathing devices.

Another object of the invention is to provide a swather attachment which is of relatively simple and rugged construction and which can therefore be manufactured cheaply enough to make it readily available to the average farmer.

Yet another object of my invention is to provide a swather attachment which may be easily attached to or detached from the tractor by anyone, not necessarily a skilled mechanic.

A further object of the invention is to provide a swather attachment having the cutting blades moving unidirectionally instead of using the reciprocating motion common with other machines of the art.

Another object of my invention is to provide a swather attachment which will be faster in operation than others of the prior art due to the fact that in my machine I have two short belts transporting the cut crop to a centre well while the central portion falls directly into the well, in contrast to conventional swathers in which the cut crop is transported fully cross the width of the machine to be deposited on one side thereof.

These and other objects of my invention are achieved by providing an open framework adapted to be attached to a tractor having power take-off facilities. The forward edge of the framework supports a row of fixed teeth, and an endless belt located adjacent the fixed teeth carries a plurality of moving teeth which, being cooperable with the fixed teeth, provide a scissor like cutting action. A paddle wheel type reel located above the cutting teeth bend the crop on the forward edge of the machine and, after the crop is cut, the reel causes it to fall back onto the two oppositely located, inwardly moving conveyor belts which I provide at each side of my machine. There is a gap between the two belts into which the centre portion of the crop falls and into which the remainder of the crop is conveyed.

In drawings which illustrate embodiments of my invention:

Figure 1:
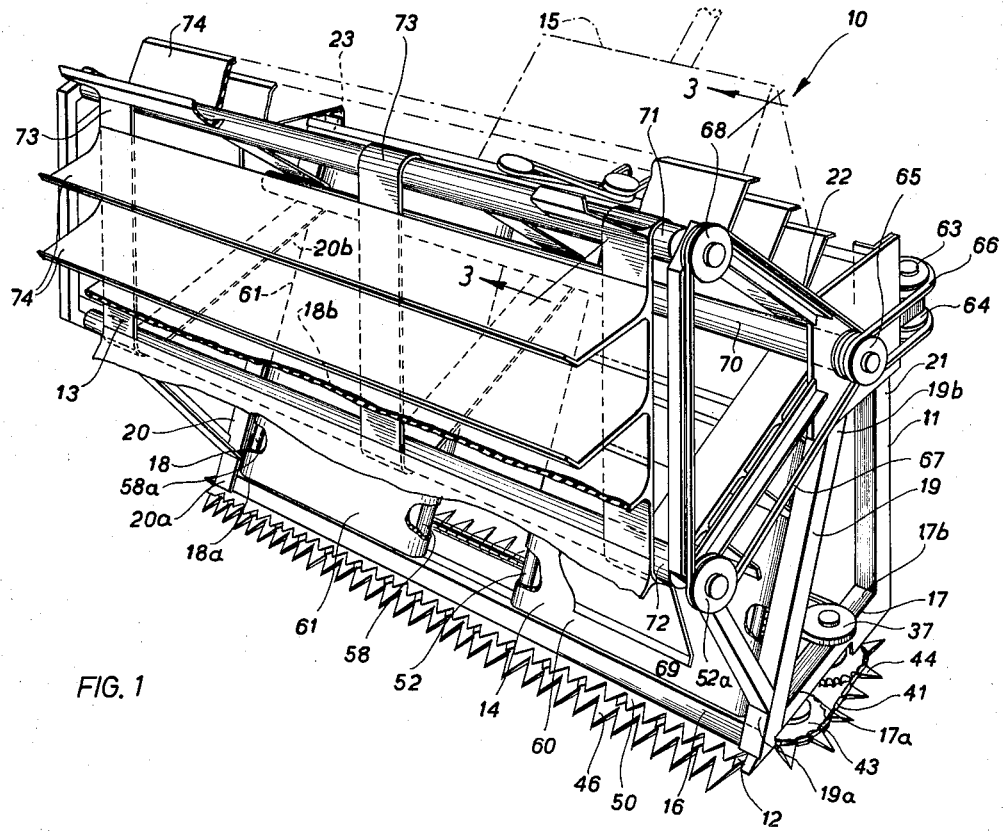
FIG. 1 is a perspective view of a swather attachment attached to the power take-off end of a tractor.
Figure 3:
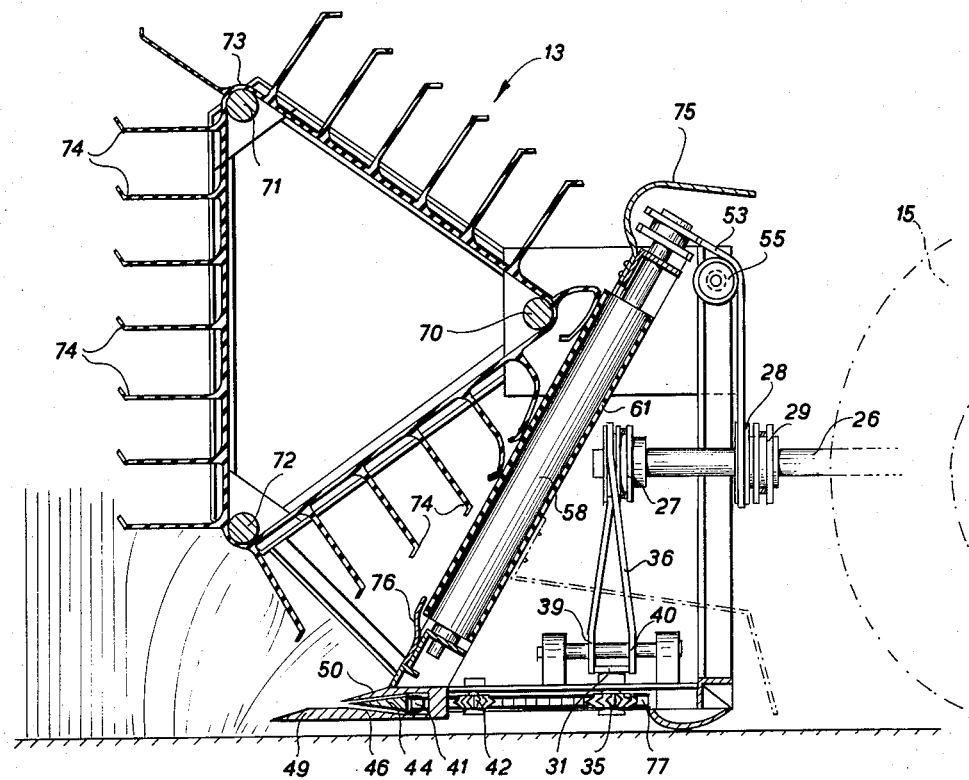
FIG. 3 is a sectional side elevation of swather attachment of FIG. 1, taken on the line 3—3.

Referring to the drawings, particularly FIGS. 1 and 3, a swather attachment 10 comprises a framework 11 supporting a cutting mechanism 12, a reel mechanism 13 and a conveyor mechanism 14. A tractor 15 supports framework 11 and provides the driving means for the various mechanisms 12, 13 and 14.

Framework 11 is preferably fabricated from a strong, rigid material such as, by way of example, angle iron, bar or tubular steel. A transverse front support bar 16 is supported by a pair of horizontal side stays 17 and 18 and a pair of reasonably, upwardly sloping side stays 19 and 20. The forward ends 17a and 19a of stays 17 and 19 converge to be attached to one end 16a of bar 16, and similarly the forward ends 18a and 20a of stays 18 and 20 converge to be attached to the opposite end 16b of bar 16.

The rearmost ends 17b, 18b, 19b and 20b of the side stays are held rigidly in position by being attached to the corresponding corners of an open rectangular frame 21 which is suitably braced to facilitate its three-point attachment to the power take-off end of tractor 15.

A pair of triangular support struts 22 and 23 extend upwardly from opposite sides of framework 11 to support the reel mechanism 13.

Figure 2:
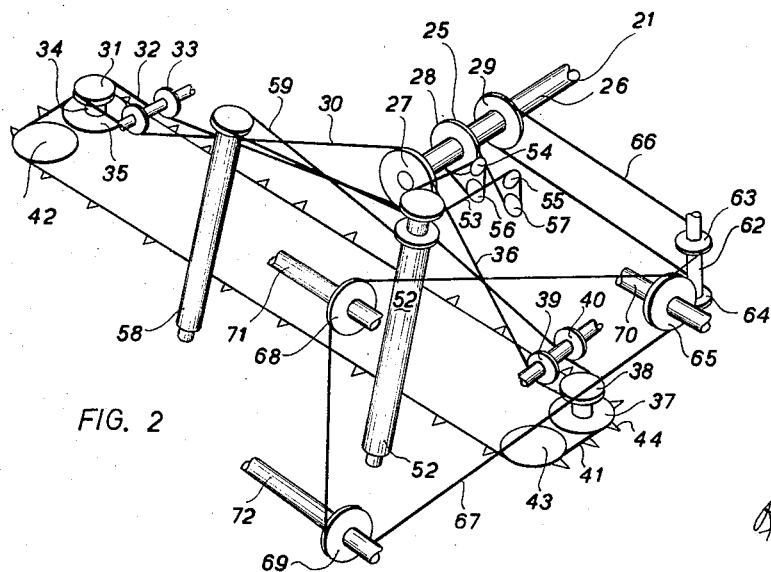
FIG. 2 is a diagrammatic sketch of the driving train of the attachment, showing the method of driving the various components thereof.

Referring also to FIG. 2, a triple spool assembly 25, adequately, rotatably supported by frame 21 is adapted to be driven by the power take-off of tractor 15 through a shaft 26. Assembly 25 comprises a front spool 27, a centre spool 28, and a rear spool 29, all of which are suitably keyed or spliced to shaft 26 to provide a positive drive.

Front spool 27 drives an endless belt 30 which passes transversely outwardly and downwardly to one side of the assembly to drive a pulley 31 in the horizontal plane, the conversion from the vertical plane of spool 27 being accomplished by a pair of idlers 32 and 33. Pulley 31 is located on the upper end of a vertical shaft 34, to the lower end of which is attached a driving sprocket 35.

In a similar arrangement on the opposite side of the assembly, an endless belt 36, also driven by front spool 27, is adapted to drive a sprocket 37 through a pulley 38 and idlers 39 and 40. Belts 30 and 36 are arranged to ensure pulleys 31 and 38 rotate in the same direction so that sprockets 35 and 37 may combine to drive a chain 41 forming part of cutting mechanism 12. An oppositely located pair of idler sprockets 42 and 43 are suitably located to further support chain 41.

Figure 4:
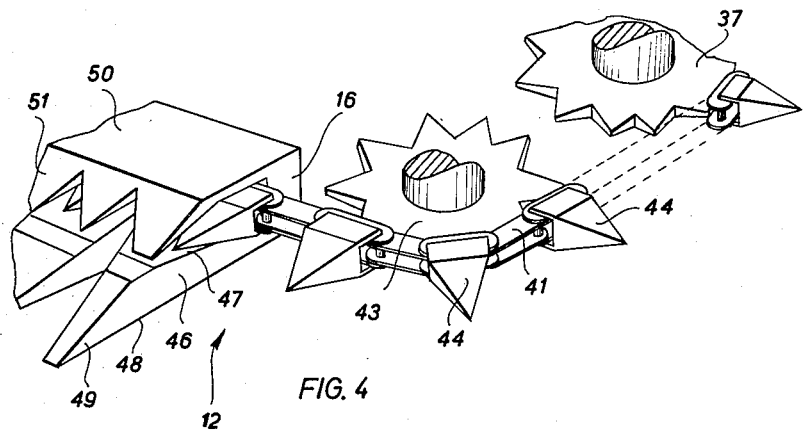
FIG. 4 is an enlarged fractional, cut away perspective view of the cutting teeth and mechanism.

Referring also to FIGS. 3 and 4, chain 41 rigidly supports a plurality of cutting teeth 44 of substantially triangular configuration, teeth 44 extending outwardly from chain 41. Transverse support bar 16 includes an open fronted, channel-section guide member 46, the channel 47 thereof being adapted to closely but slidably receive chain 41 and teeth 44.

The lower wall 48 of guide member 46 protrudes forwardly and is serrated to form a plurality of comb-like teeth 49, the upper wall 50 of member 46 being similarly serrated to form teeth 51.

Teeth 44 moving through channel 47 combine with static teeth 49 and 51 to provide a highly efficient cutting action. Teeth 44 are sufficiently spaced apart from static teeth 49 and 51 to permit them to move freely therebetween and, at the same time, they are close enough to ensure a guillotine-like cutting action. It should be noted that the gaps between teeth 44 and the static teeth 49 and 51 are somewhat exaggerated in FIG. 3 in the interest of greater clarity.

Centre spool 28 is adapted to drive a substantially vertical shaft 52 through an endless belt 53, the change of plane being accomplished through a pair of guide pulleys 54–55 in the fore and aft plane and a second pair of pulleys 56–57 in the transverse plane. Another vertical shaft 58, similar in all respects to shaft 52 and spaced apart therefrom an equal distance about the centre of the device 10, is driven by a crossed belt 59 to rotate in the opposite direction to shaft 52.

Shafts 52 and 58 are each adapted to drive wide feed belts 60 and 61 respectively, the said belts being fabricated from canvas or the like, belt 60 being stretched between shaft 52 and a freely rotatable centre shaft 52a while belt 61 is similarly stretched between shaft 58 and a freely rotatable centre shaft 58a. Shafts 52 and 58 are adapted to rotate in opposite directions so that both the feed belts 60 and 61 have their forward surfaces moving toward the centre of device 10.

The rearmost spool 29 of the triple spool assembly 25 is adapted to drive the reel mechanism 13. A vertical shaft 62 carrying an upper pulley 63 and a lower pulley 64 is mounted on one side of the machine 10, pulleys 63 and 64 guiding a belt 66 around one sheave of a double pulley 65 which is mounted forwardly of shaft 62 in the vertical, fore and aft plane. The other sheave of pulley 65 drives another belt 67 which passes forwardly and upwardly around an upper pulley 68 in the same plane as pulley 65, then continues substantially downwardly around a lower pulley 69 coplanar with pulley 68 and from there passes rearwardly to complete its triangular path at double pulley 65.

Pullies 65, 68 and 69 are integral with three transverse shafts 70, 71 and 72 respectively which extend across the width of device 10 and are suitably retained in rotatable engagement with frame 11.

From the description and drawing it will be obvious that shafts 70, 71 and 72, when driven by their respective pulleys, all rotate in the same direction and a reel belt 73 stretched over them will be made to move downwardly and then rearwardly when viewed from the front.

Reel belt 73 may comprise a single piece of material stretching substantially the width of device 10 or may comprise a plurality of narrower belts in spaced apart relation. A plurality of flaps 74 extend radially outwardly from and transversely across belt 73 in parallel, spaced apart relation, being attached thereto at their inner edges in such a manner that excessive pressure causes them to fold back toward belt 73 or, alternatively, the material from which they are fabricated is semi-rigid, resilient sheet material such as a flexible, high impact plastic, which may be caused to bend upon excessive pressure being applied thereto.

In operation, upon a swather attachment 10 being attached to a tractor 15 and driven into a standing crop the flaps 74 of reel mechanism 13 contact the crop and push it rearwardly. Simultaneously, the cutting mechanism 12 severs the crop close to the ground so that the cut stalks are impelled by flaps 74 as well as by their own weight and the forward motion of the device to fall against the feed belts 60 and 61. The centre portion of the cut crop falls between belts 60 and 61 while the remainder is conveyed by belts 60 and 61 inwardly to fall between the said belts so that a substantially uniform swath or windrow is formed as machine 10 moves through the crop.

Additional refinements to the invention are illustrated in FIG. 3 in which an upper shield 75 is fitted at the top of framework 11 to the rear of reel mechanism 13 to prevent any loose hay, grain or the like blowing back onto the tractor operator. A similar shield 76 across the bottom of framework 11 to the rear of conveyor mechanism 14 is fitted to deflect any loose portions of the crop onto the ground rather than into the remainder of the mechanism or into the tractor.

A skid 77 may also be fitted to the underside of each side stay 17 and 18, preferably at the rearmost end thereof, to hold lower teeth 49 of cutting mechanism 12 sufficiently clear of the ground to avoid their striking small stones and the like while still cutting the crop at a reasonably economical height.

I also contemplate fitting my machine with protective side covers where the cutting teeth 44 pass outside framework 11 as an added safety device.

It will be apparent to anyone skilled in the art that, upon cutting teeth 44 becoming worn at their leading edges, their direction may be reversed merely by making a figure of eight twist in each drive belt 30 and 36 so that the previously trailing edges now become leading edges. Furthermore, if it should be found that one side, upper or lower, of teeth 44 is wearing more quickly than the other, chain 41 and its teeth 44 may easily be removed and inverted in order to even up the wear during the cutting season.

Furthermore, by utilizing different sized pulleys throughout, as may be required, the speed of operation of the various components may be varied either singly or collectively to suit the crop being harvested.

The embodiments of the invention in which an exclusive property or privilege is claimed are defined as follows:

A swather attachment including a framework detachably attachable to the power take-off end of a tractor; said framework having a front support bar remote from said tractor and extending transversely across the lower end thereof; a cutting mechanism supported by said front support bar; a reel mechanism supported by said framework above and spaced apart from said cutting mechanism; a conveyor means supported by said framework rearwardly of said cutting mechanism; said cutting mechanism including at least one row of stationary teeth and an endless chain supporting a plurality of moving teeth, said chain causing said moving teeth to move across said stationary teeth and cooperate therewith to provide a shearing action; said reel mechanism including a wide, flexible sheet of plastic material; a plurality of flexible plastic flaps constituting the outer surface of said flexible sheet; said flaps extending transveresly of said flexible sheet in spaced apart relation; three transverse rotatable shafts in triangulate disposition supporting said flexible sheet in driving engagement; each of said shafts supporting an integral pulley at one end; one of said pulleys being double-sheaved; a pair of wide, flexible conveyor belts equally disposed about the centre of said attachment and spaced apart from each other; each of said conveyor belts being supported at one end by a driven shaft and at the opposite end by an idler shaft; a first driving means between said power take-off and said chain supporting said moving teeth; a second driving means including a pulley on said power take-off and a pulley on each of said driven shafts supporting said conveyor belts; a first belt drive between said pulley on said power take-off and one of said pullies on one of said driven shafts; a second belt drive between the pulleys of said driven shafts; said second belt drive causing said driven shafts to rotate in opposite directions to cause the forward surfaces of said conveyor belts to move towards the centre of said attachment; a third driving means including a third belt drive between said power take-off and one sheave of said double-sheaved pulley of said reel mechanism; a fourth belt drive between the remaining sheave of said double-sheaved pulley and the said integral pulleys of said reel mechanism; said third and fourth belt drives causing said reel to move downwardly and rearwardly when viewed from the side; and said flexible plastic flaps contacting said conveyor belts over part of the run and deflecting upon contact.

References Cited by the Examiner

UNITED STATES PATENTS

| | | | |
|---|---|---|---|
| 64,523 | 5/1867 | Goodwin et al. | 56—219 |
| 1,906,498 | 5/1933 | Templeton | 56—23 |
| 2,209,997 | 8/1940 | Nordhougen | 56—220 |
| 2,510,245 | 6/1950 | Munter | 56—192 X |
| 2,821,060 | 1/1958 | Schoffner | 56—292 |

FOREIGN PATENTS

| | | |
|---|---|---|
| 520,882 | 3/1955 | Italy. |

ANTONIO F. GUIDA, *Acting Primary Examiner.*

RUSSELL R. KINSEY, *Examiner.*